April 30, 1963
C. W. TINSLEY
3,087,220
WORM DRIVE HOSE CLAMP
Filed April 5, 1961
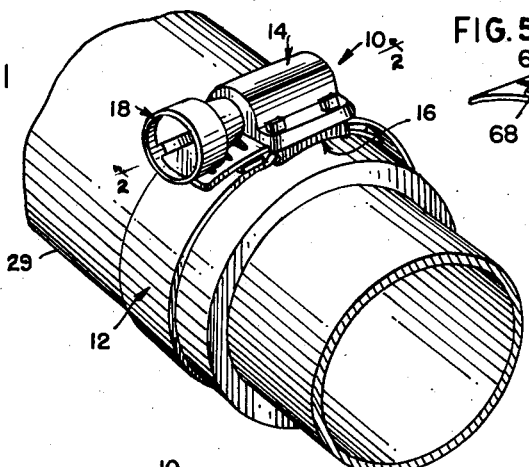
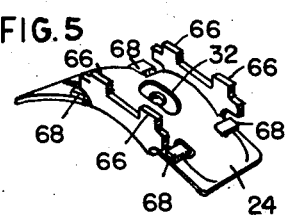
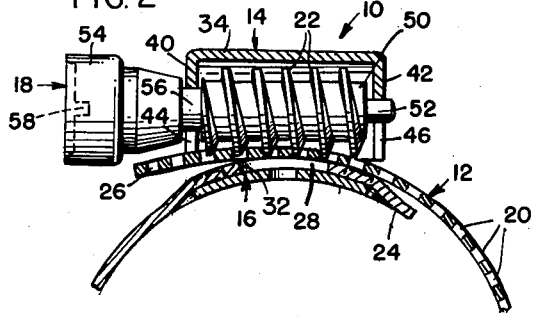
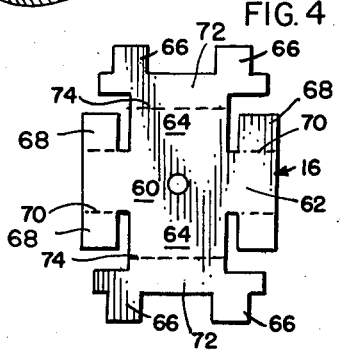
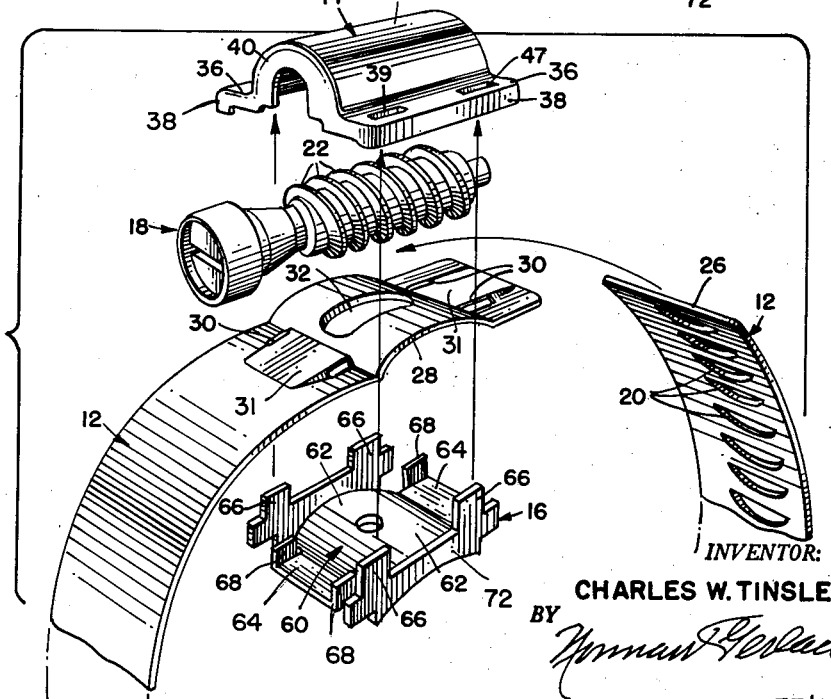
INVENTOR:
CHARLES W. TINSLEY
BY
ATT'Y

United States Patent Office 3,087,220
Patented Apr. 30, 1963

3,087,220
WORM DRIVE HOSE CLAMP
Charles W. Tinsley, Western Springs, Ill., assignor to Du Page Manufacturing Company, a corporation of Illinois
Filed Apr. 5, 1961, Ser. No. 100,966
1 Claim. (Cl. 24—274)

The present invention relates to hose clamps of the type which is commonly employed in the automotive industry for the coupling of hose connections to radiators, engine blocks, power steering and power brake apparatus, water pumps and the like. The invention is particularly concerned with that type of hose clamp wherein the opposite ends of a flexible clamping band or strap are adapted to be acted upon by a freely rotatable operating worm or screw in such a manner that the band may be constricted about a hose connection and centripetal force thus applied to the hose connection to retain the latter in coextensive sealing engagement with a cylindrical pipe or flange to establish a fluid tight connection therewith. While the improved hose clamp of the present invention has been designed primarily for such automotive use, the invention may, if desired, be employed in other fields, as, for example, a clamp for a hose for conducting compressed air, gasoline or other fluids in aircraft, as a piston ring compressor, or as a clamp for securing the ends of flexible tubing or conduits to large diameter attachment flanges in sandblasting or sand scrubbing equipment. Irrespective, however, of the particular use to which the present invention may be put, the essential features thereof are at all times preserved.

Worm drive hose clamps of the character briefly outlined above have found extensive use, particularly in the automotive industry. Because of their wide range of adjustment, they are useable in connection with both small and large diameter hose connections. Such clamps are inexpensive to manufacture and they are easy to apply and remove. The manufacture of such hose clamps has become fairly well standardized and such standardization is exemplified by numerous patents including United States Patent No. 2,395,273, granted on February 19, 1946, and entitled "Hose Clamp." Such patent discloses a specific type of worm drive hose clamp which has found considerable favor on the market. This type of clamp is comprised of only three coacting elements, namely, a structurally rigid box-like housing, a clamping band, and a worm. The rigid housing is secured to the band near one end thereof and receives the other end region of the band slidably therethrough. The worm is rotatably mounted within the box-like housing and has one end thereof projecting from the housing for worm manipulating purposes. The thread of the worm is engageable with a series of teeth which extend inwardly from the sliding end of the band and, by rotation of the worm in one direction or the other, the free end region of the band is slid through the housing to either constrict or expand the band, as desired. It has been found expedient to manufacture the worm housing of such a hose clamp as a composite two-piece assembly, including a cap portion and a base portion. The cap portion is commonly referred to as the housing cap, while the base portion is commonly termed the saddle. The saddle is connected to the normally stationary end of the metal clamping band and is fastened to the housing cap. The improvement of the present invention resides in the manner of connecting the saddle or base portion of the composite housing to the stationary end of the metal band and to the housing cap.

Heretofore, the saddle has been connected to the stationary end of the metal band by spot-welding it to the band or by the use of rivets. Both the spot-welding and the riveting procedures have produced connections which are likely to break loose when the clamp is in service.

The principal object of the present invention is to provide a novel type of connection between the saddle and the clamping band which obviates the use of welds or rivets and which offers an appreciably greater degree of strength, durability and reliability in service than has heretofore been attained in connection with hose clamps of the type under consideration.

A further object of the invention is to provide a hose clamp of this general character and in which the saddle is fixedly secured to the stationary end of the clamping band by interlocking tangs and recesses on the saddle and clamping band respectively, and in which the saddle is secured to the housing cap by similar interlocking tangs and recesses on the saddle and housing cap respectively, with the various tangs and recesses being so oriented in the assembled structure as to afford maximum resistance to such stresses as are imposed when the tightening operation of the band is effected.

A similar and related object of the invention is to provide a hose clamp of the aforementioned type and wherein the interlocking tangs and recesses of the saddle and band respectively, and of the saddle and housing cap respectively, are so designed as to preclude movement of the saddle longitudinally of the band, or movement of the housing cap longitudinally of the saddle.

With these and other objects in view, which will become more readily apparent as the nature of the invention is better understood, the invention consists of the novel construction, combination and arrangement of parts which are shown in the accompanying single sheet of drawing forming a part of this specification.

In this drawing:
FIG. 1 is a fragmentary perspective view showing a worm drive hose clamp constructed in accordance with the principles of the present invention and in operative position on a hose connection;
FIG. 2 is a sectional view taken on the plane indicated by the line 2—2 of FIG. 1 in the direction indicated by the arrows;
FIG. 3 is an exploded perspective view of the saddle, clamping band, worm, and housing cap, showing these parts in their oriented positions immediately prior to assembly operations;
FIG. 4 is a plan view of a saddle blank employed in connection with the invention; and
FIG. 5 is a fragmentary perspective view of the assembled saddle and clamping band preparatory to installation thereon of the worm and worm housing.

Referring now to the drawings in detail, and in particular to FIG. 1, a hose clamp constructed in accordance with the principles of the present invention has been designated in its entirety at 10 and it involves in its general organization four principal component parts, namely, a clamping band 12, an upper housing part 14, a lower housing part 16, and a worm 18. The upper and lower housing parts 14 and 16, when assembled upon each other, and upon one end of the band 12, constitute a composite worm housing within which the worm 18 is disposed and within which it is rotatable. Two-piece composite worm housings of this character are known in the art. The upper housing part is commonly referred to as the housing cap, and the lower housing part is referred to as the saddle, as heretofore mentioned. Such terminology will be employed hereafter.

The band 12 is in the form of an elongated flexible strip of resilient sheet metal stock, preferably tempered stainless steel, and of uniform width. It is formed with a plurality of equally-spaced perforations or openings 20 which are cut or punched therein at such an angle as to cooperate with the threads 22 of the band-tightening worm 18. The spaced openings extend inwardly from one end of the band 12 a sufficient distance longitudinally of the band that the latter may be employed in connection with hose connections of widely varying diameter although it is preferable that the band be of a length which will accommodate a limited range of hose diameters.

The end of the band which has been designated by the reference numeral 24 is fixed relatively to the housing, while the other end 26 thereof is slidable relatively to the housing for band contraction and expansion purposes in a manner that will be made clear presently. As best seen in FIG. 3, the fixed end region of the band 12 is crimped so as to form an offset region 28 which is arcuate in longitudinal cross section and provides a curved semi-cylindrical seat for the saddle 16, as well as accommodation for the curvature of the outside cylindrical curvature of a hose such as the hose 29 to which the clamp 10 is shown as being applied in FIG. 1. On each side of the arcuate offset portion 28 there are provided a pair of punched recesses 30 which are separated by a raised portion 31. The recesses extend lengthwise of the band as clearly shown in FIG. 3. The crest of the offset portion 28 is formed with a longitudinally extending slot 32. The purpose of the recess 30 and of the slot 32 will be made clear subsequently.

The housing cap 14 is of unitary rigid box-like construction and it is preferably in the form of a sheet metal stamping which, in its finished form, includes a generally semi-cylindrical top wall 34, the lower side regions of which are turned laterally outwardly as at 36 and then downwardly as at 38 to provide a pair of side aprons. The housing cap 14 is also provided with end walls 40 and 42 which are slotted as at 44 and 46, respectively, for reception of certain hereinafter mentioned tangs. The laterally-turned side regions 36 are formed with recesses 47 therein, the function of which will be described presently.

The worm 18 is provided with an enlarged body portion 50 upon which the threads 22 are formed. A short stem 52 projects axially outwardly through the slot 46 in the end wall 42. The worm 18 is further provided with an enlarged head 54 which is separated from the body portion 50 by a narrow annular groove 56, this groove being straddled by the side edges of the slot 44. The head 54 is provided with a kerf 58 in the outer end face thereof and it is designed to receive therein the operative end of a screw driver or similar tool (not shown) by means of which the worm may be rotated in one direction or the other.

The fixed end region 24 of the band 12 is interposed between the housing cap 14 and the saddle 16. The saddle is generally of spider-like design and includes a central body portion 60 from which there extends laterally a pair of arms 62 and from which there also extends longitudinally a pair of arms 64. The laterally extending arms 62 are provided with respective pairs of upstanding tangs 66, while the longitudinally extending arms 64 are provided with a pair of upstanding tangs 68. The tangs 66 are designed for reception in the recesses 47 in the side regions 36 of the housing cap 14 of the composite housing, while the tangs 68 are designed for reception in the recesses 30 in the fixed end region 24 of the clamping band 12. The body portion 60 is arcuate in longitudinal cross section and this arcuate portion of the saddle 60 is adapted to fit against the underneath concave arcuate surface of the curved offset portion 28 of the clamping band 12. The distance between the two pairs of upstanding tangs 66 is slightly greater than the width of the clamping band 12 so that these tangs will straddle the band when the parts are assembled.

The saddle 16 is in the form of a sheet metal stamping and the blank from which the saddle is formed is shown in detail in FIG. 4. As seen in such figure of the drawing, the tangs 68 are bent upwardly out of the plane of the blank at the outer ends of the arms 62 along bend lines indicated in dotted lines at 70. The arms 64 are provided with enlargements 72 at their outer ends and the tangs 66 lie in the plane of these enlargements so that when the enlargements are bent upwardly out of the plane of the blank along bend lines as indicated in dotted lines at 74, the tangs 66 will automatically assume a vertical position. It is to be noted at this point that all of the tangs 66 and 68 lie in respective planes which extend longitudinally of the fixed end region 24 of the clamping band 12, this unidirectional positioning of these tangs constituting one of the principal features of the present invention.

In the assembly of the four component parts of the hose clamp 10, as best seen in FIG. 3, the upstanding tangs 68 are passed upwardly through the four recesses 30 in the fixed end regions 24 of the clamping band 12, while the arcuate body portion 60 of the saddle 60 is caused to nest within the concave underneath side of the arcuate offset portion 28 of the band 12. Thereafter, the tangs 68 are bent laterally outwardly and flattened upon the upper side of the fixed end region 24 in order securely to hold the saddle and fixed end region of the band 12 together, as shown in FIG. 5. The worm 18 may then be positioned within the housing cap 14 of the composite housing so that the stem 52 extends through the slot 46 and the slot 44 straddles the reduced portion of the worm afforded by the annular groove 56, and so that the body portion 50 of the worm is substantially wholly disposed within the confines of the housing cap 14. With the worm 18 thus in position within the housing cap 14, the previously-assembled saddle 16 and fixed end region 24 of the band 12 are brought into juxtaposition relatively to the housing cap 14 and the tangs 66 are passed upwardly through the recesses 47 and, thereafter, these tangs are bent inwardly as shown in FIG. 1 in order securely to lock the housing cap in position on the saddle and thus complete the composite housing assembly. Finally, the movable end region 26 of the band 12 is threaded through the housing as shown in FIG. 2 so that the slots 20 are caused to register with the threads 22 of the worm 18. The diameter of the head 54 of the worm 18 is sufficiently large that the worm may initially be turned by hand until the worm threads 22 have completely picked up the effective threads created by the various openings 20 and establish a threaded driving connection between the worm 18 and sliding end of the band as is customary in connection with conventional worm drive hose clamps.

It is to be noted that when the slidable end region 26 of the clamping band 12 projects through the composite housing in the manner described above, and the threads 22 are in operative register and engagement with the openings 20, the extreme ends of the two slots 44 and 46 hold the worm 18 against the clamping band so that thread slippage is prevented. The axis of the worm then becomes fixed and it is substantially coaxial with the axis of the housing so that there will be no lateral shifting of the worm relatively to the housing. It also is to be noted that the recesses 30 and 47 are in the form of elongated slots which extend in the direction of the length of the band and that the various tangs 66 and 68 substantially fill these slots when the parts are assembled. By such an arrangement, an appreciable thickness of the metal of each tang is offered as a backing to assimilate the pull which is exerted thereon when the clamping screw 18 is tightened.

In the use of the hose clamp 10, the band is placed about the hose 29 (see FIG. 1) so as to encircle the latter, and the end 26 of the band 12 is fed through the limited space which is provided for it between the worm 18 and the curved offset portion 28 of the fixed end 24 of the band. The free end of the band is first fed into the space until such time as the threads 22 of the worm engage the edges of the openings 20 so that operative worm and band engagement is initially effected. Thereafter, the worm may be rotated in the proper direction to feed the sliding end region of the band completely through the housing to take up band slack preparatory to tightening the band upon the hose. The previously mentioned elongated slot 32 in the offset portion 28 of the band affords a clearance region for the portions of the threads 22 which may project completely through the openings 20 of the band. As tension is applied to the band 12, the band will be constricted about the hose 29 and the longitudinal elongated tangs 68 on the saddle 60 will absorb the longitudinal thrust which is applied to the saddle by the band. Since these tangs are set on edge, so to speak, in the longitudinal direction of the band and in the direction of the applied force, they are capable of withstanding an appreciable degree of longitudinal pull without bending or shearing. Similarly, the tangs 66 which also are longitudinally elongated and are set on edge against the direction of pull exerted by the housing cap 14 when the worm 18 is tightened against the band, exert an appreciable degree of resistance to shearing stresses.

The invention is not to be limited to the exact arrangement of parts shown in the accompanying drawing or described in this specification as various changes in the details of construction may be resorted to without departing from the spirit of the invention. Therefore, only insofar as the invention has particularly been pointed out in the accompanying claim is the same to be limited.

Having thus described the invention what I claim as new and desire to secure by Letters Patent is:

In a hose clamp of the character described, a joint between a flexible metal band and a housing comprising a saddle connected to the band and constituting a housing base, and a housing cap secured to the saddle, each side margin of the band being formed with a pair of longitudinally spaced, elongated tang-receiving slots, the direction of elongation of said slots extending longitudinally of the band, said slots being spaced inwardly from the side edges of the band, said saddle having a body portion underlying the band and having upstanding longitudinally elongated tangs, spaced inwardly of the side margins of the saddle complemental to and secured in said slots for securing the saddle to the band, said housing cap having oppositely extending lateral exensions overlying the side margins of the saddle respectively, each extension being provided with longitudinally spaced and longitudinally extending elongated tang-receiving slots therein, said saddle being provided with upstanding elongated, longitudinally extending tangs at the side edges thereof, straddling the band and projecting upwardly thereabove, said latter tangs being complemental to and secured in the slots of said lateral extensions for securing the housing cap to the saddle.

References Cited in the file of this patent
UNITED STATES PATENTS 2,395,273   Hill et al. _____ Feb. 19, 1946
2,825,113   Schaefer _____ Mar. 4, 1958